(12) United States Patent
Pachler

(10) Patent No.: US 12,348,644 B2
(45) Date of Patent: Jul. 1, 2025

(54) WALLET, DATABASE SYSTEM AND METHOD FOR PRODUCING A WALLET

(71) Applicant: Infineon Technologies AG, Neubiberg (DE)

(72) Inventor: Walther Pachler, Graz (AT)

(73) Assignee: Infineon Technologies AG, Neubiberg (DE)

( * ) Notice: Subject to any disclaimer, the term of this patent is extended or adjusted under 35 U.S.C. 154(b) by 185 days.

(21) Appl. No.: 17/935,668

(22) Filed: Sep. 27, 2022

(65) Prior Publication Data

US 2023/0100641 A1 Mar. 30, 2023

(30) Foreign Application Priority Data

Sep. 30, 2021 (DE) .................. 102021211035.5

(51) Int. Cl.
*H04L 9/32* (2006.01)
*G06Q 20/36* (2012.01)
*H04L 9/08* (2006.01)

(52) U.S. Cl.
CPC .......... *H04L 9/3247* (2013.01); *G06Q 20/36* (2013.01); *H04L 9/0825* (2013.01)

(58) Field of Classification Search
CPC ....... H04L 9/3247; H04L 9/0825; H04L 9/50; G06Q 20/36; G06Q 30/06
See application file for complete search history.

(56) References Cited

U.S. PATENT DOCUMENTS

| 10,693,636 B2* | 6/2020 | Watanabe ............. H04L 9/3236 |
| 2017/0221052 A1* | 8/2017 | Sheng ........................ H04L 9/14 |
| 2018/0183587 A1* | 6/2018 | Won ..................... H04L 63/166 |
| 2019/0128754 A1 | 5/2019 | Fonk et al. |
| 2019/0197378 A1 | 6/2019 | Garner |

OTHER PUBLICATIONS

Wikipedia, "General Purpose Input/Output", 5 pgs., Sep. 29, 2021.
Wikipedia, "Random Seed", 2 pgs., Mar. 12, 2021.
Apr. 28, 2022—(DE) Office Action—App 102021211035.5.

\* cited by examiner

*Primary Examiner* — Sm A Rahman

(74) *Attorney, Agent, or Firm* — Banner & Witcoff Ltd.

(57) ABSTRACT

A wallet including an electronic data storage unit for storing wallet information, and a data interface configured to provide a read access to the electronic data storage unit. A controller of the wallet is configured to control the wallet at a first point in time in a first operating mode, in which there is a restriction for the read access to the wallet information, and to control the wallet at a later second point in time in a second operating mode, in which the restriction to the read access is cancelled. The transition from the first operating mode to the second operating mode is irreversible.

23 Claims, 6 Drawing Sheets

WALLET, DATABASE SYSTEM AND METHOD FOR PRODUCING A WALLET

TECHNICAL FIELD

The present disclosure relates to a wallet comprising an electronic data storage unit for storing wallet information, to a database system for operating such a wallet, and to a method for producing a wallet.

BACKGROUND

Digital values, so-called cryptotokens, can be managed in database systems. In this case, cryptotokens can be equivalent among one another, but concepts also exist in which cryptotokens are configured as unique or non-fungible.

A transfer of cryptotokens from one user, account, credit or the like to another can be verified and stored in the database system. In this case, it is possible to store a number of cryptotokens assigned to a specific credit or user, but also, particularly in the case of non-fungible cryptotokens, information about which cryptotoken is assigned.

A wallet, a database system and a method for producing a wallet for secure use of the wallet are desirable.

SUMMARY

According to one exemplary embodiment, a wallet comprises an electronic data storage unit for storing wallet information, a data interface configured to provide a read access to the electronic data storage unit, and a control unit configured to control the wallet at a first point in time in a first operating mode, in which there is a restriction for the read access to the wallet information, and to control the wallet at a later second point in time in a second operating mode, in which the restriction to the read access is cancelled. A transition from the first operating mode to the second operating mode is irreversible.

According to one exemplary embodiment, a database system comprises such a wallet and a repository configured to manage cryptotokens of the database system. The wallet is associated with the cryptotoken in the database system, and the wallet information is associated with the cryptotoken. The database system is configured to change an association of the cryptotokens in the database system using the wallet information.

According to one exemplary embodiment, a method for producing a wallet comprises providing an electronic data storage unit for storing wallet information, providing a data interface in order to provide a read access to the electronic data storage unit, and arranging a control unit configured to control the wallet in a first operating mode, in which there is a restriction for the read access to the wallet information, and to control the wallet in a second operating mode, in which the restriction to the read access is cancelled. The method is implemented such that the control unit in the wallet carries out the transition from the first operating mode to the second operating mode irreversibly.

DESCRIPTION OF THE DRAWINGS

Preferred embodiments of the present disclosure are explained in greater detail below with reference to the accompanying drawings, in which.

DETAILED DESCRIPTION

Figure 1A:
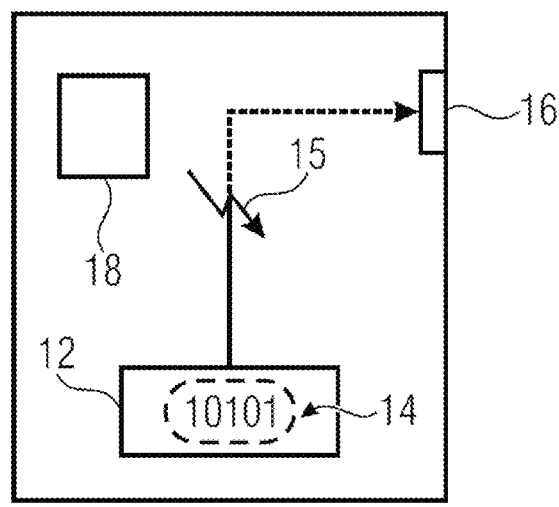
FIG. 1a shows a schematic block diagram of a wallet according to one exemplary embodiment and in a first operating mode.

Before exemplary embodiments of the present disclosure are more specifically explained in detail below with reference to the drawings, it is pointed out that identical, functionally identical or identically acting elements, objects and/or structures in the various figures are provided with the same reference signs, such that the description of these elements presented in various exemplary embodiments is mutually interchangeable or can be applied to one another.

Exemplary embodiments described below are described in association with a large number of details. However, exemplary embodiments can also be implemented without these detailed features. Furthermore, to facilitate comprehension, exemplary embodiments are described using block diagrams as a substitute for a detailed illustration. Furthermore, details and/or features of individual exemplary embodiments can be combined with one another in a straightforward way, as long as there is no explicit description to the contrary.

FIG. 1 a shows a schematic block diagram of a wallet 10 according to one exemplary embodiment. A wallet can be understood as a kind of electronic purse or the like which has information within a database system, for example—but without this being restrictive—a blockchain system, which makes possible information for associating or allocating so-called cryptotokens of the database system with/to a user, a wallet or the like.

The wallet 10 comprises an electronic data storage unit 12 for storing wallet information 14. In this case, the data storage unit can be a volatile, but preferably nonvolatile, data storage unit having a number of storage cells for storing information.

The wallet information 14 can be information which is usable within the database system in order to check or to change an association of a cryptotoken with a user, a wallet or the like. By way of example, the wallet information can be a public or private key of a key pair or some other cryptotoken information.

The wallet 10 comprises a data interface 16 configured to provide a read access to the electronic data storage unit 12. That means that the data storage unit 12 can be accessed at least at times by means of the data interface 16. The access to the wallet information 14 can be restricted temporally, but further information in the data storage unit 12 can be accessed both outside and within this time. By way of example, the data interface 16 is formed such that it provides wireless communication, for instance near field communication (NFC), and/or comprises one or more antennas. However, this is just one example, which does not exclude wired data interfaces.

The wallet 10 comprises a control unit 18 configured to control the wallet 10 into different operating modes. In this case, a first operating mode illustrated in FIG. 1a comprises a restriction—illustrated by means of a lightning symbol 15—of the read access to the wallet information, that is to say that, by means of the data interface 16, the wallet information 14 is protected against readout in the first operating mode. In the first operating mode, for example, no information at all can be read from the data storage unit 12 or information different than the wallet information 14 can be readable, while the wallet information is not output. A decision about this can be taken actively for example by the control unit 18, for example by a read access to specific areas of the data storage unit 12 being allowed or denied, or a protective device in terms of hardware technology can be involved, which prevents a corresponding read access to the data storage unit 12.

In other words, the control unit can be configured, in the first operating mode, during communication via the data interface 16, to read information different than the wallet information from the electronic data storage unit and to output it at the data interface. By way of example, in the first operating mode the information can be a public key of a key pair and the second information can be the corresponding private key or information derived therefrom, for example a signature generated therefrom. The signature can be created for example by information being obtained via the data interface 16, which information is signed using the private key in order to obtain the signature, whereupon the signature can be sent back via the data interface 16.

According to a further embodiment possibility, which is combinable with those mentioned above in a straightforward way, the data storage unit 12 can also comprise a plurality of data storage areas or separately arranged data storage elements, only a portion of which can be read in the first operating mode, the wallet information being stored at most incompletely, or not being stored, in this portion.

Figure 1B:
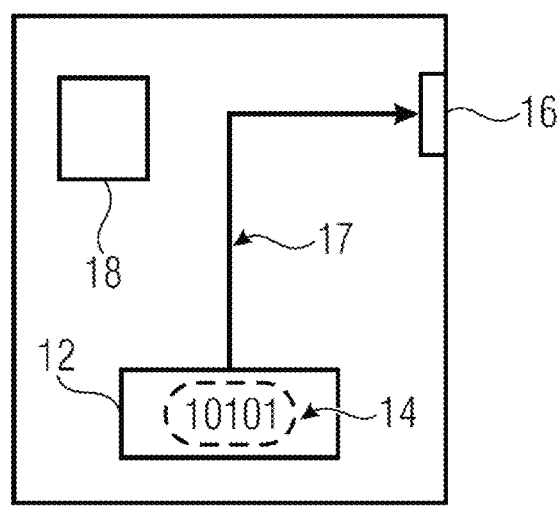
FIG. 1b shows a schematic block diagram of the wallet from FIG. 1a in a second operating mode.

FIG. 1b shows the wallet 10 in a second operating mode, that is to say that the control unit 18 controls the wallet 10 differently than in FIG. 1a. In the second operating mode, the restriction to the read access as explained in FIG. 1a is cancelled, as is illustrated with the aid of the solid line 17 between the data interface 16 and the data storage unit 12. The wallet information 14 can be readable via the data interface 16 or can be output.

The transition from the first operating mode illustrated in FIG. 1a to the second operating mode illustrated in FIG. 1b is irreversible in this case, as will be explained in even greater detail below. The transition can be effected for example by an irreversible programming, for instance using software or firmware, or by means of a change to the wallet 10 in terms of hardware technology, which does not exclude other means. Both a reprogramming of the control unit 18 and an irreversible change in an electronic interconnection with the wallet that is carried out as an alternative to said reprogramming or in combination can have the effect that the wallet information 14 can be read out or used only at the point in time at which the corresponding change or reprogramming took place, as a result of which this event can be regarded as a kind of cancellation for the wallet 10.

It becomes clear from this that the wallet 10 can be designed for monitoring and/or limiting a number of a use or the readout of the wallet information and in particular for permitting a one-time use of the wallet information 14, which may be suitable for example for services, for instance a postal dispatch, a transfer of a specific credit, the redemption of a voucher or the like.

Figure 2A:
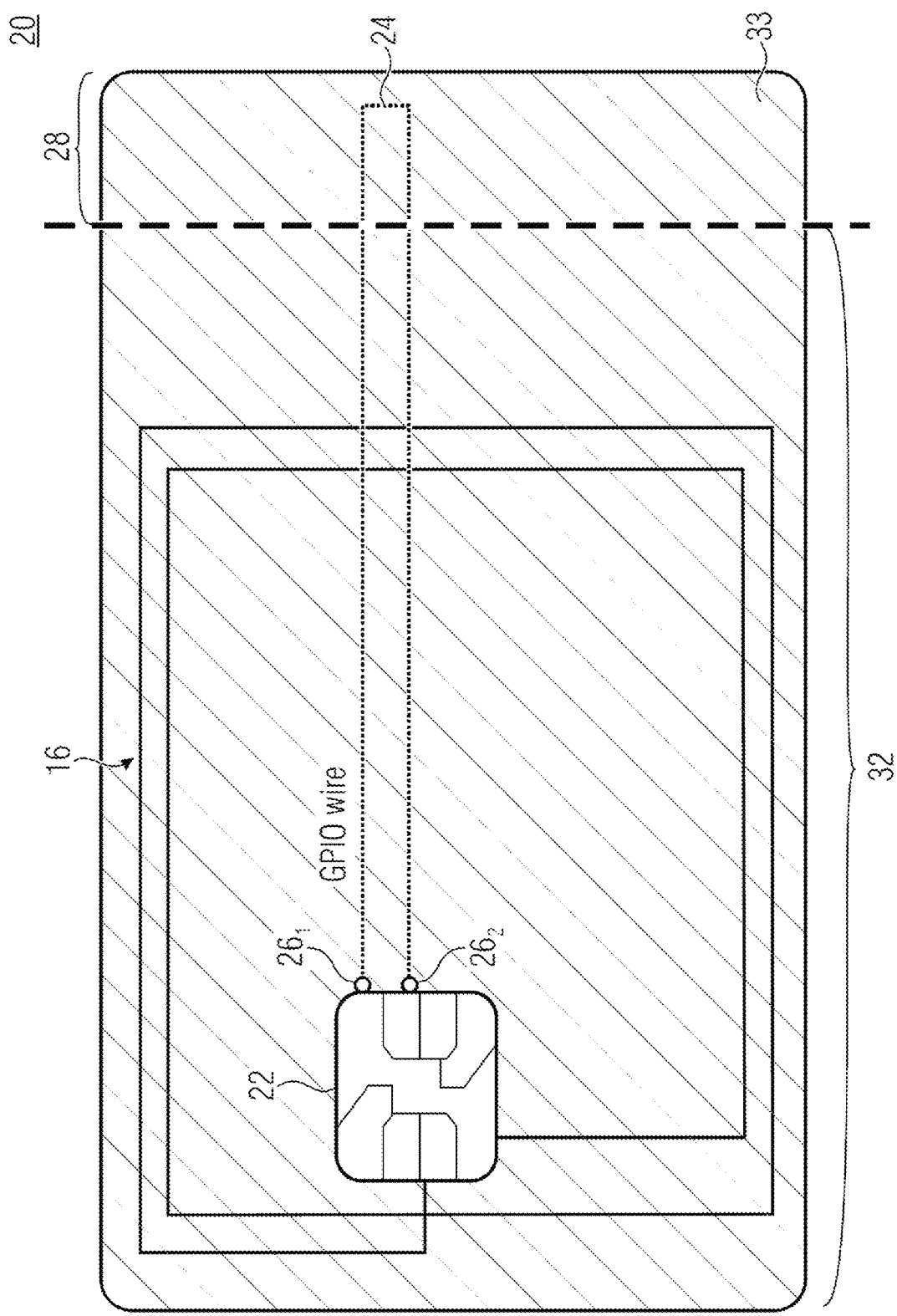
FIG. 2a shows a schematic plan view of a wallet according to one exemplary embodiment, wherein the wallet comprises a secure computing unit.

FIG. 2a shows a schematic plan view of a wallet 20 according to one exemplary embodiment. The wallet 20 comprises a secure computing unit (referred to as: secure element) 22, which can provide for example the function of the data storage unit 12 and of the control unit 18 of the wallet 10. That is to say that the secure element 22 can store the wallet information 14, as was described for the data storage unit 12, and can access it, as was described for the control unit 18, and so descriptions in association with firstly the data storage unit 12 and secondly the control unit 18 can straightforwardly also relate to the secure element 22, and vice versa.

Although a format similar to a smart card is illustrated by way of example, it is possible to produce any other articles in accordance with the disclosure of the embodiments, for example banknotes, casino tokens, rings, pieces of jewelry or the like.

The data interface 16 can be implemented as an NFC interface and can provide an antenna connected or coupled to the secure element 22, via which antenna information and/or energy for the operation of the secure element 22 can be received and information can be provided.

The wallet 20 can be configured to carry out the transition from the first operating mode to the second operating mode on the basis of a change in the electrical interconnection of the wallet 20. For this purpose, the control unit or the secure element 22 can be coupled to a circuit element 24. The circuit element 24 can comprise a minimum or maximum ohmic resistance, an electrical inductance and/or an electrical capacitance, wherein such a property or a combination of properties can be irreversibly changeable with regard to the value thereof in order to trigger the changeover from the first operating mode to the second operating mode. The control unit or the secure element 22 can be configured to change over from the first operating mode to the second operating mode on the basis of a change in the electrical property of the circuit element as a change in the electrical interconnection.

With regard to the change in the electrical interconnection by virtue of a change in an electrical property, the wallet 20 can be configured for example to change a distance between two circuit elements as a result of a mechanical pressure, which can lead to a changed and measurable electrical capacitance. Alternatively or additionally, an electrical inductance and/or an electrical conductivity can be changed.

According to a non-restrictive exemplary embodiment, the wallet 20 is designed such that the circuit element 24 comprises an electrical line, for example a freely programmable input/output line or more generally a digital contact pin (referred to as: general purpose input output, GPIO), which is connected between two terminals $26_1$ and $26_2$ of the control unit or secure element 22. As a result, the two terminals $26_1$ and $26_2$ can be electrically or galvanically connected to one another in the first operating mode. On the basis of a disconnection of the electrical connection, the control unit or the secure element 22 can change over from the first operating mode to the second operating mode.

For this purpose, one embodiment in accordance with the present disclosure provides for the circuit element 24 to be arranged at least partly in a separation region 28 of the wallet in the first operating mode illustrated in FIG. 2a. The separation region can be configured to be mechanically separated from a remaining region of the wallet 20, wherein the remaining region 32 does not necessarily comprise the complete region remaining, but preferably a region in which the control unit or the secure element 22 is arranged. As a result, the circuit element 24 or the conduction track provided between the terminals $26_1$ and $26_2$ can be interrupted, which can be ascertained by the secure element 22, whereupon the control unit or the secure element 22 can change over from the first operating mode to the second operating mode.

The mechanical separation of the separation region 28, for instance by bending, tearing off, cutting off or the like, is understood to be irreversible in the context of the present disclosure. Even if it were possible, in principle, to re-establish the electrical connection for example by means of a soldering process or the like, this may nevertheless be associated with disproportionately high complexity and expenditure. Independently of this, the control unit 18 or the secure element 22 can be configured to prevent a reversion to the first operating mode, even if the original state of the circuit element 24 is re-established.

The terminals $26_1$ and/or $26_2$ can comprise or form (a) GPIO terminal(s), such that e.g. a single GPIO terminal or two GPIO terminals is/are present, which can be controlled or evaluated by the secure element 22, for instance by application of a signal at least during a time in which the secure element is supplied with energy. According to one embodiment, the terminals $26_1$ and $26_2$ comprise one GPIO terminal. The other terminal can indeed likewise be a GPIO terminal, but can alternatively also be a reference terminal, for example ground, GND.

Just like the wallet 10, the wallet 20 can be formed as a hardware token in which the control unit is embedded. For this purpose, the control unit 18 can be embedded as an autonomous element or in combination with other elements such as, for example, the data storage unit, as was described in association with the secure element 22.

In the first operating mode, an electrically conductive connection embedded in the hardware token can be coupled between two terminals of the control unit, for instance the terminals $26_1$ and $26_2$. The wallet 20 can be configured to provide an interruption of the electrically conductive connection upon a separation of a predefined region, for instance the separation region 28, of the hardware token, whereupon the control unit can change over to the second operating mode on the basis of the interruption.

Even though the wallet 20 is illustrated as a smart card, a wallet in accordance with embodiments described herein can have any other form factor and/or any other exterior shape.

While access to the wallet information is wholly or partly restricted in the first operating mode, the wallet 10 and/or the wallet 20 can provide the wallet information or permit readout in the second operating mode. The wallet can be configured to permit a predetermined number of uses of the wallet information and to restrict or to prevent a further use when the predefined number of uses is reached. In this this regard, the wallet 10 and/or 20 can change over to a third operating mode, in which the use is again wholly or partly restricted. The use of the wallet information can alternatively or additionally also be restricted on the part of the database system in which the wallet is operated. In this case, the predefined number can be an arbitrary number greater than 0, for example 1, 2, 3 or higher.

A use of the wallet information can comprise for example the generation of specific information, for example of a signature or the like. In this regard, the wallet information can comprise for example—but without this being restrictive—a private key of a key pair. In the second operating mode, the control unit or the secure element 22 can be configured to generate a signature using the private key. Such an operation can be counted by the control unit, such that only the predefined number of signatures is output. Alternatively, corresponding counting or monitoring of the number of uses can also be dispensed with and optionally be effected in the database system.

Figure 2B:
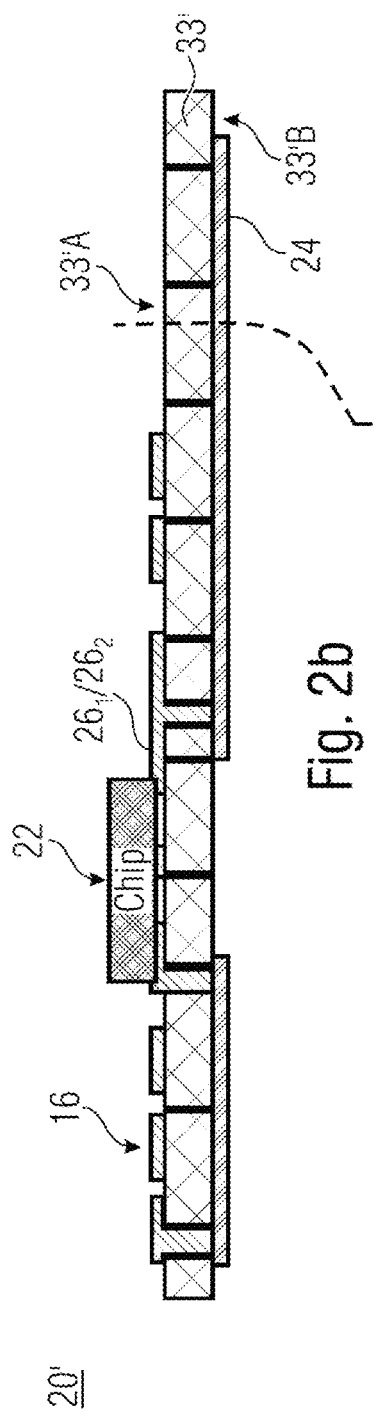
FIG. 2b shows a schematic lateral sectional view of a wallet according to one exemplary embodiment, wherein the wallet has a circuit board as carrier substrate.
Figure 2C:
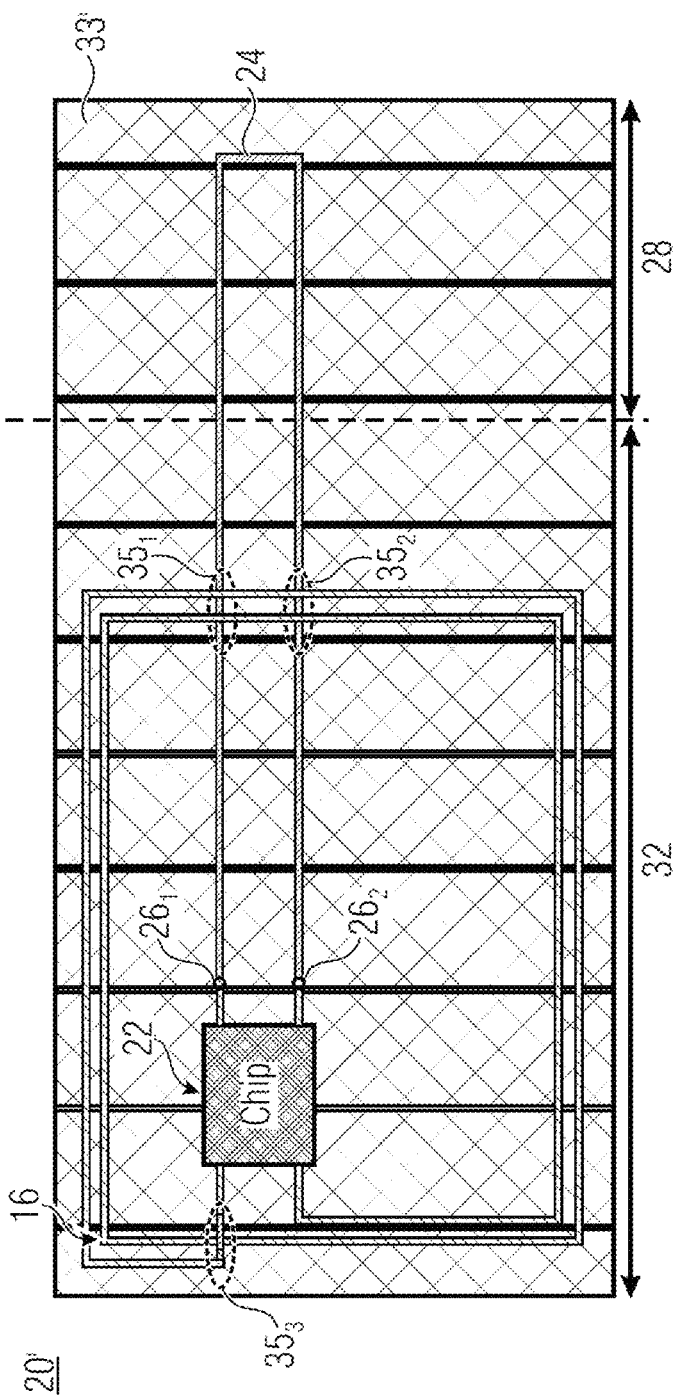
FIG. 2c shows a schematic plan view of the wallet according to FIG. 2b.

FIG. 2b shows a schematic lateral sectional view of a wallet 20' according to one exemplary embodiment, with respect to which view FIG. 2c shows a corresponding plan view. The wallet 20' can provide at least some of the functions of the wallet 20. While the secure element 22 and/or conductor tracks, for instance of the data interface 16 and/or of the circuit element, of the wallet 20 can be wholly or partly embedded in a carrier substrate, for instance using a plastics material or a resin material for the carrier substrate, a carrier substrate 33' of the wallet 20' can have e.g. a circuit board or the like, at least a portion of the components being arranged and/or interconnected on the surfaces thereof. The carrier substrate 33' can comprise e.g. a printed circuit board (PCB) as circuit board.

In the plan view in FIG. 2c, the carrier substrate 33' is illustrated in a transparent fashion in order to elucidate the embodiment, although it is pointed out that such transparency is possible, but not necessary. Rather, referring to FIG. 2b, it shall be explained that different components of the wallet can be arranged on different and opposite main sides 33'A and 33'B of the carrier substrate 33', which makes possible a simple configuration of the conductor track routing, in particular in a region of overlaps $35_1$ to $35_3$ to be avoided. There, for example, the circuit element can be arranged on a different main side than the data interface or antenna 16 and can be routed e.g. by way of via structures from one main side 33'A to the opposite main side 33'B. For this configuration, two conductor track planes or levels on the carrier substrate may already be sufficient, which does not exclude additional levels. Moreover, additional layers can be arranged, for instance for covering the conductor tracks or the like. For this purpose, protective layers, for instance comprising polymers or resins, can optionally likewise be used, such as e.g. lacquers.

In a particularly simple manner, a predetermined breaking location for separating the separation region 28 from the remaining region 32 can be inserted into a printed circuit board, for instance by way of local thinning, perforation or the like.

According to one exemplary embodiment, the wallet 10, 20 and/or 20' can be configured to transition to a third operating mode after a readout of the wallet information or after a use of the wallet information in the database system, a further use of the wallet information being restricted or prevented in said third operating mode.

Figure 3:
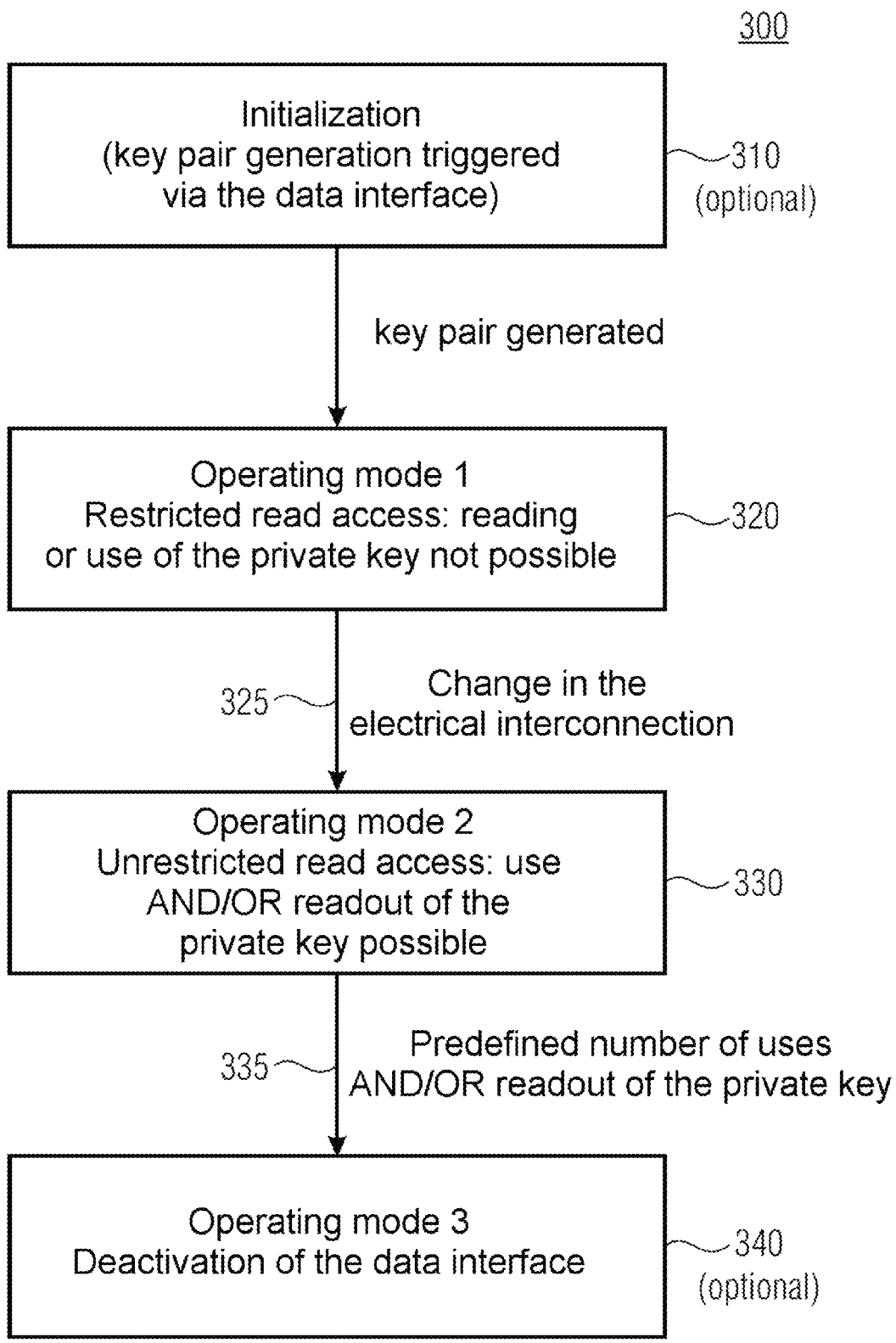
FIG. 3 shows a schematic illustration of an exemplary sequence of possible operating states of wallets described herein.

Referring to FIG. 3, which shows an exemplary sequence of possible operating states of the wallet 10, 20 and/or wallet 20', proceeding from the first operating mode (block 320), in which a restricted read access is provided, which does not allow the for example private key to be read or used, it is possible to change over to the second operating mode (block 330) by means of a change 325 in the electrical interconnection. An unrestricted read access can optionally take place here, thereby allowing the private key to be used and/or read out. Upon reaching 335 a predefined number of uses and/or readout operations of the wallet information or of information derived therefrom, for instance of the private key or the signature, it is possible to change over to an optional third operating mode (block 340). Here the control unit 18 or the secure element 22 can for example deactivate the data interface 16 and/or erase the wallet information. In other words, the control unit can be configured to deactivate the data interface in the optional third operating mode in order to prevent a further read access to the wallet information.

Optionally, the control unit 18 or the secure element 22 can be configured, during an initialization before the first operating mode, to generate the wallet information and to store it in the electronic data storage unit. In this regard, the control unit or the secure element can be configured to receive a start value via the data interface 16 and to generate the wallet information according to a seed mechanism, e.g. according to BIP39. By way of example, a key pair comprising a private key and a public key can be obtained as a result. The wallet information can comprise the private key or information derived therefrom, and the public key can be output via the data interface for example in the first operating mode or the third operating mode. As a result, an identity of the wallet can be checked, for example, even if the wallet is not yet or no longer in the second operating mode.

Figure 4:
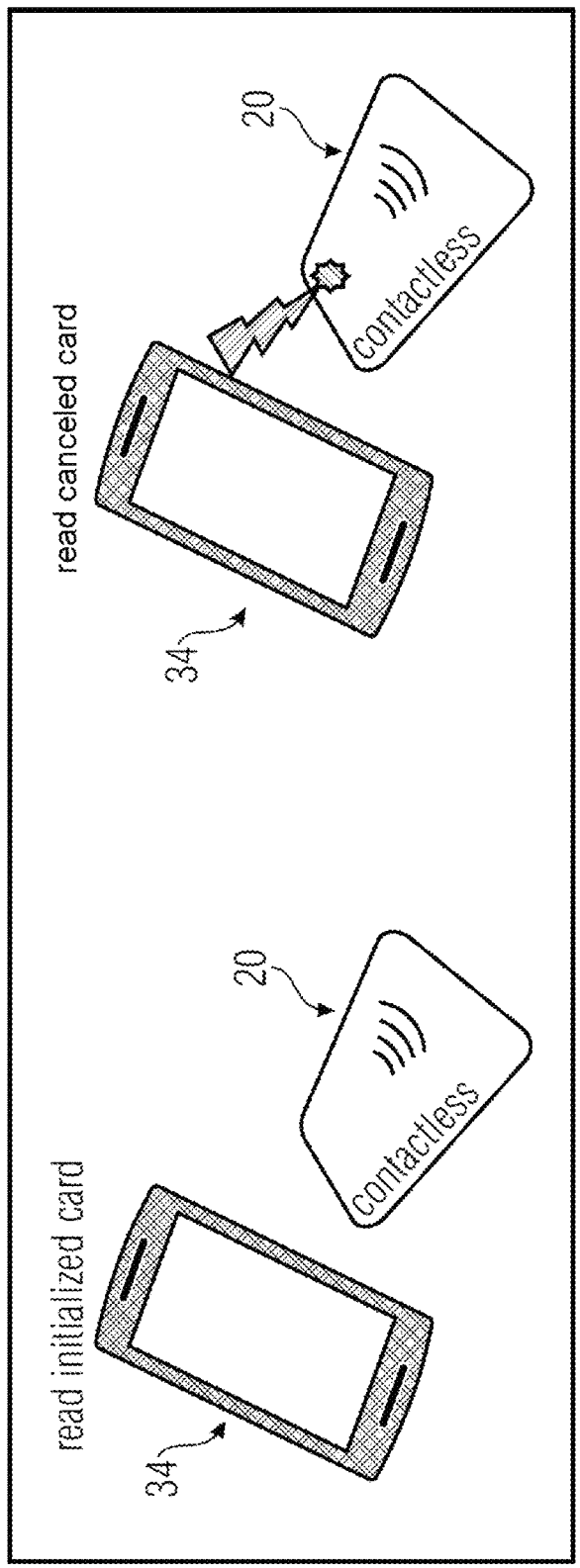
FIG. 4a shows an exemplary illustration of the wallet from FIG. 2a being read by a device according to one exemplary embodiment.
FIG. 4b shows an exemplary illustration of an attempt at reading a cancelled wallet according to one exemplary embodiment.

FIG. 4a shows by way of example a process of the wallet 20 being read by a device 34, which for example is configured for near field communication and can have a corresponding reader. These explanations are straightforwardly valid for the wallet 20' as well. By way of example, this can involve a cellular phone, in particular a so-called smartphone, wherein tablet computers and/or reading devices at supermarket checkouts or the like can have corresponding communication interfaces. An initialized card, for example being in the second operating mode, can interact with the device 34, as a result of which for example a cryptotoken of a database system, in particular a unique or non-fungible cryptotoken of a database system, can be transferred, for example to a user of the device 34.

FIG. 4b illustrates that a cancelled wallet, in which the predefined maximum number of uses of the wallet information has been reached, does not provide the corresponding function any more, for instance on account of a decision in the database system or on account of a changeover of the wallet into the third operating state.

In other words, FIGS. 4a and 4b show two different readout modes of a concept in accordance with exemplary embodiments. After the initialization of a wallet or cryptotoken described herein, a contactless reader, for instance a smartphone, can be used to verify the amount of cryptocurrency tokens via the database system. If the card is cancelled, for instance by the separation region being separated, the private key can be read out. The private key or the information obtained therefrom can be read out for example just once or a predetermined number of times, for instance in order to prevent an excessively large number of uses.

In the state in FIG. 4a, for example, an authentication can take place in order to verify the authenticity of the issued chip or to confirm the validity thereof. An issued chip can be understood to mean, with regard to a use of the chip, e.g. putting in circulation, for instance by selling, giving as a gift or any other handing over, where any other ways of making the chip available or providing it for use are also possible. For authentication purposes, for example, a public key of a key pair can be issued and/or an online verification of the value of the wallet can be effected by way of database system data.

In the embodiment in FIG. 4b, the card is changed for example by interruption of the circuit element 24 or of the connection between the terminals, the private key thereby being enabled. The card can be deactivated after the private key has been output.

Figure 5:
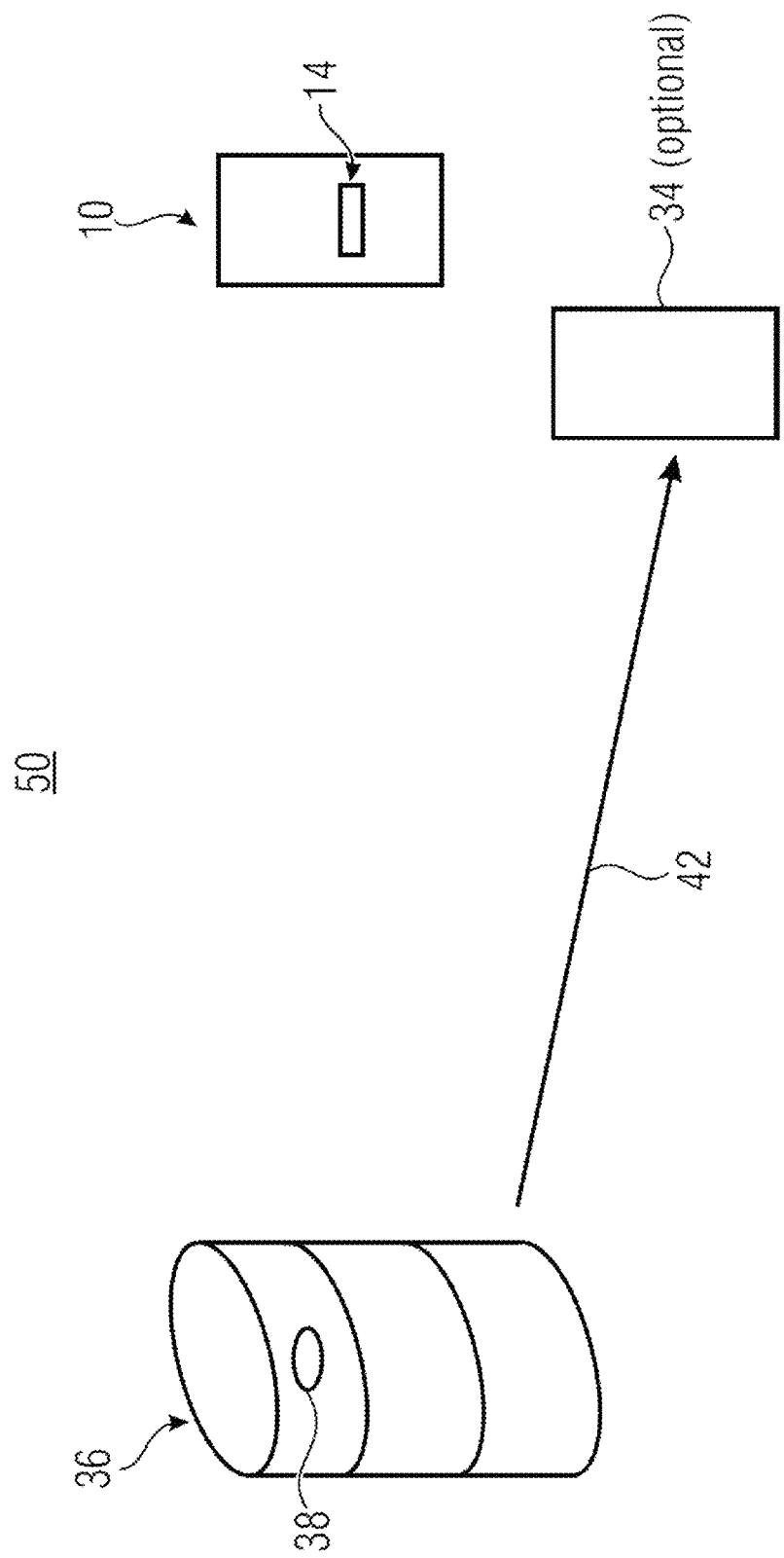
FIG. 5 shows a schematic block diagram of a database system, according to one exemplary embodiment.

FIG. 5 shows a schematic block diagram of a database system 50 according to one exemplary embodiment. The database system 50 comprises a repository 36 configured to manage a cryptotoken 38 of the database system 50. The repository 36 can be configured to manage an arbitrary number of cryptotokens (e.g. millions thereof). A repository can be understood to be a kind of keeping location or storage location for storing or managing the corresponding information, and this can involve a centralized or distributed keeping location or a distributed arrangement of storage units.

The database system can be a closed or open/distributed database system. While a closed database system such as is used for banks or central banks, for example, can have a physically or virtually partitioned storage unit as repository 36, a database system configured as a block chain system, for example, can also have a plurality or a multiplicity of publicly accessible storage units connected by a public data network, for instance the Internet.

Furthermore, the database system 50 comprises the wallet 10, wherein the wallet 20 or 20' can also be part of the database system 50 in a straightforward way. A multiplicity of wallets 10, 20 and/or 20' can be arranged in database systems 50 in accordance with embodiments described herein.

The wallet 10 can be associated with the cryptotoken 38 in the database system, for instance by means of corresponding information in the repository 36. The wallet information 14 can in turn be associated with the cryptotoken 38, irrespective of whether the wallet information 14 itself or information derived therefrom is output by means of the wallet 10.

The database system 50 is configured to change an association of the cryptotoken in the database system using the wallet information 14. That means that the cryptotoken can be output or used, for example. In this regard, the cryptotoken can for example be invalidated or be transferred to a different wallet or be associated with a different wallet.

According to one embodiment, the wallet 10, 20 and/or the wallet 20' is a kind of token that makes it possible to obtain a product and/or service. The issuing of the product and/or service can result in a cancellation of the wallet or in a transfer of the cryptotoken to the subscriber of the database system 50 issuing the product or the service.

A use of the wallet information 14 can be stored in the database system, which also makes it possible to monitor the number of uses of the wallet information 14.

According to one exemplary embodiment, the database system is configured on the basis of a use of the wallet information 14 in the database system, to exclude the wallet information from a further use or to restrict a further use. That is to say that when a maximum use is reached, for example, a further transfer of the wallet information 14 to other subscribers and/or an association with a different subscriber or the confirmation for issuing a product and/or service or the like are/is denied. This can be effected by non-execution of corresponding computation operations in the repository 36, but can also alternatively or additionally comprise transferring to the optional device 34 in the database system 50 corresponding information that the use of the cryptotoken or the transfer thereof is refused.

In other words, exemplary embodiments relate to so-called block chain cryptotoken wallets which, in exemplary embodiments, can have a so-called NFC security chip, a secure element, and can operate in a key-based manner, for example using so-called non-fungible cryptotokens, which may also be referred to as ERC-721 cryptotokens. The latter provide individual cryptotokens which, in contrast to other cryptotokens, for instance the ERC-20 cryptotokens, differ from any other cryptotokens. That means that the ERC-721 or non-fungible cryptotokens each have their own characteristic. The latter may be regarded as a unique serial number, for example.

Embodiments combine firstly an NFC functionality with an antenna and secondly the connection of a GPIO interface to a wire. In an initialization phase of the chip, a key pair that accords with the database system or the block chain can be generated, possibly according to one-time use, one-time only. By way of example, a private key and a public key can be obtained from this. This can be used to output cryptocurrency tokens, where the private key, for instance as wallet information, is known only to the respective individual chip, thereby hampering or preventing the outputting of the cryptotoken by a different subscriber or a different device of the database system.

The public key is readable by way of the NFC interface, for example. This can make it possible for a read process specific to the database system, for instance an APE (application programming interface), to be enabled to check the level of "credit" of the wallet. Other checking operations can also be made possible as a result, for example an owner of the wallet. In order to check the authenticity of the control unit and the firmware thereof, an additional authentication provided for the readout process of the public key can be implemented. This can be achieved for example by way of an additional key pair designed for this and output separately or a certificate which for example is not used for the cryptocurrency of the cryptotoken.

A wallet in accordance with embodiments described herein may be regarded as a physical form of cryptotokens, which can be used in a similar manner to cash or standard money. In order for offline tokens described to be used online and for the cryptotokens to be transferred back into the database system or the block chain system, a possibility of reading out the private key is described which is a one-time possibility or which is provided with a predefined number of maximum uses. As described in association with FIG. 2a, for example, a predetermined region, for instance the separation region 28, can be provided for being separated, broken off or cut off and in the process for interrupting a line provided for this. Once the line has been interrupted, the firmware of the control unit or of the secure element or of the chip can be configured to change over to the second operating mode, in which the private key, the wallet information, is readable. Once this possibility has been opened up, the device 34, for instance an NFC telephone, can be used for reading out and using the private key or the information derived therefrom and for outputting online the cryptotokens associated with the wallet. After the readout process or the maximum number of uses reached, the firmware can deactivate the NFC interface, for example, which can achieve the effect that the cryptotokens cannot be used any more.

A first aspect describes a wallet comprising:
an electronic data storage unit (12) for storing wallet information (14);
a data interface (16) configured to provide a read access to the electronic data storage unit (12);
a control unit (18; 22) configured to control the wallet at a first point in time in a first operating mode, in which there is a restriction for the read access to the wallet information (14); and to control the wallet at a later second point in time in a second operating mode, in which the restriction to the read access is cancelled;
wherein a transition from the first operating mode to the second operating mode is irreversible.

A second aspect describes a wallet according to aspect 1, which is configured to carry out the transition from the first operating mode to the second operating mode on the basis of a reprogramming of the control unit (18; 22) and/or on the basis of an irreversible change in an electrical interconnection of the wallet.

A third aspect describes a wallet according to aspect 2, which is configured to carry out the transition from the first operating mode to the second operating mode on the basis of a change in the electrical interconnection of the wallet; wherein the control unit (18; 22) is coupled to a circuit element (24);
wherein the control unit (18; 22) is configured to change over from the first operating mode to the second operating mode on the basis of a change in an electrical property of the circuit element (24) as change in the electrical interconnection.

A fourth aspect describes a wallet according to aspect 3, wherein the circuit element (24) comprises an electrical line (24) connected between two terminals ($26_1$, $26_2$) of the control unit (18; 22) in order to electrically connect the two terminals ($26_1$, $26_2$) to one another; wherein the control unit (18; 22) is configured to change over from the first operating mode to the second operating mode on the basis of a disconnection of the electrical connection.

A fifth aspect describes a wallet according to aspect 3 or 4, wherein in the first operating mode the circuit element (24) is arranged at least partly in a separation region (28) of the wallet, and the separation region (28) is configured to be mechanically separated from a remaining region (32) of the wallet in order to bring about the change in the electrical interconnection of the wallet.

A sixth aspect describes a wallet according to any of aspects 3 to 5, wherein the two terminals ($26_1$, $26_2$) comprise at least one GPIO terminal.

A seventh aspect describes a wallet according to any of the preceding aspects, which is formed as a hardware token in which the control unit (18; 22) is embedded;
wherein in the first operating mode an electrically conductive connection (24) embedded in the hardware token is coupled between two terminals ($26_1$, $26_2$) of the control unit (18; 22);
wherein the wallet is configured to provide an interruption of the electrically conductive connection upon a separation of a predefined region (28) of the hardware token; and
wherein the control unit (18; 22) is configured to change over to the second operating mode on the basis of the interruption.

An eighth aspect describes a wallet according to any of the preceding aspects, wherein the control unit is configured, in the second operating mode, to permit a predetermined number of uses of the wallet information (14) and to restrict or to prevent a further use when the predefined number of uses is reached.

A ninth aspect describes a wallet according to any of the preceding aspects, wherein the wallet information (14) comprises a private key, wherein the wallet is configured to generate a signature using the private key in the second operating mode.

A tenth aspect describes a wallet according to any of the preceding aspects, which is designed in accordance with a database system; and which is configured to change over to a third operating mode after a readout of the wallet information (14) or after a use of the wallet information (14) in the database system, a further use of the wallet information (14) being restricted or prevented in said third operating mode.

An eleventh aspect describes a wallet according to aspect 10, wherein the control unit is configured to deactivate the data interface (16) in the third operating mode in order to prevent a further read access to the wallet information (14).

A twelfth aspect describes a wallet according to any of the preceding aspects, wherein the wallet information (14) is second information and wherein the control unit is configured, in the first operating mode, to read first information different than the second information from the electronic data storage unit (12) and to output it at the data interface (16).

A thirteenth aspect describes a wallet according to aspect 12, wherein the first information comprises a public key of a key pair and the second information comprises a private key of the key pair or information derived therefrom.

A fourteenth aspect describes a wallet according to any of the preceding aspects, which is designed in accordance with a database system; and wherein the wallet information (14) comprises a private key of the database system.

A fifteenth aspect describes a wallet according to any of the preceding aspects, which is designed in accordance with a database system; and wherein the wallet information (14) represents at least one unique cryptotoken of the database system.

A sixteenth aspect describes a wallet according to any of the preceding aspects, where the data interface (16) comprises a wireless communication interface, in particular a near field communication interface.

A seventeenth aspect describes a wallet according to any of the preceding aspects, wherein the control unit is configured, upon an initialization of the wallet, to generate the wallet information (14) and to store it in the electronic data storage unit (12).

An eighteenth aspect describes a wallet according to aspect 17, wherein the control unit is configured to receive a start value via the data interface (16) and to generate the wallet information (14) according to a seed mechanism.

A nineteenth aspect describes a wallet according to aspect 18, which is configured to generate a key pair comprising a public key and a private key from the start value, wherein the wallet information (14) comprises the private key; and to output the public key in the first operating mode via the data interface (16).

A twentieth aspect describes a database system (50) comprising:
a repository configured to manage a cryptotoken of the database system; and
a wallet (10; 20) as claimed in any of the preceding claims, which is associated with the token in the database system; wherein the wallet information (14) is associated with the token;
wherein the database system is configured to change an association of the cryptotoken in the database system using the wallet information (14).

A twenty-first aspect describes a database system according to aspect 20, which is configured to store a use of the wallet information (14) in the database system (50).

A twenty-second aspect describes a database system according to aspect 20 or 21, which is configured, on the basis of a use of the wallet information (14) in the database system, to exclude the wallet information (14) from a further use or to restrict a further use.

A twenty-third aspect describes a method for producing a wallet comprising the following steps:
providing an electronic data storage unit (12) for storing wallet information (14);
providing a data interface (16) in order to provide a read access to the electronic data storage unit (12);
arranging a control unit (18; 22) configured to control the wallet in a first operating mode, in which there is a restriction for the read access to the wallet information (14); and to control the wallet in a second operating mode, in which the restriction to the read access is cancelled;
such that a transition from the first operating mode to the second operating mode is irreversible.

Although some aspects have been described in association with a device, it goes without saying that these aspects also constitute a description of the corresponding method, and so a block or a component of a device should also be understood as a corresponding method step or as a feature of a method step. Analogously thereto, aspects that have been described in association with or as a method step also constitute a description of a corresponding block or detail or feature of a corresponding device.

Depending on specific implementation requirements, exemplary embodiments of the disclosure can be implemented in hardware or in software. The implementation can be effected using a digital storage medium, for example a floppy disk, a DVD, a Blu-ray disk, a CD, a ROM, a PROM, an EPROM, an EEPROM or a FLASH memory, a hard disk or some other magnetic or optical storage unit on which are stored electronically readable control signals which can interact or interact with a programmable computer system in such a way that the respective method is carried out. Therefore, the digital storage medium can be computer-readable. Some exemplary embodiments according to the disclosure thus comprise a data carrier having electronically readable control signals which are able to interact with a programmable computer system in such a way that one of the methods described herein is carried out.

Generally, exemplary embodiments of the present disclosure can be implemented as a computer program product comprising a program code wherein the program code is effective for carrying out one of the methods when the computer program product runs on a computer. The program code can for example also be stored on a machine-readable carrier.

Other exemplary embodiments comprise the computer program for carrying out one of the methods described herein, where the computer program is stored on a machine-readable carrier.

In other words, one exemplary embodiment of the method according to the disclosure is thus a computer program comprising a program code for carrying out one of the methods described herein when the computer program runs on a computer. A further exemplary embodiment of the methods according to the disclosure is thus a data carrier (or a digital storage medium or a computer-readable medium) on which the computer program for carrying out one of the methods described herein is recorded.

A further exemplary embodiment of the method according to the disclosure is thus a data stream or a sequence of signals which constitute(s) the computer program for carrying out one of the methods described herein. The data stream or the sequence of signals can be configured for example to the effect of being transferred via a data communication connection, for example via the Internet.

A further exemplary embodiment comprises a processing unit, for example a computer or a programmable logic component, which is configured or adapted to the effect of carrying out one of the methods described herein.

A further exemplary embodiment comprises a computer on which the computer program for carrying out one of the methods described herein is installed.

In some exemplary embodiments, a programmable logic component (for example a field programmable gate array, an FPGA) can be used to carry out some or all functionalities of the methods described herein. In some exemplary embodiments, a field programmable gate array can interact with a microprocessor in order to carry out one of the methods described herein. Generally, in some exemplary embodiments, the methods are carried out on the part of an arbitrary hardware device. The latter can be universally usable hardware such as a computer processor (CPU) or hardware specific to the method, such as an ASIC, for example.

The exemplary embodiments described above merely constitute an illustration of the principles of the present disclosure. It goes without saying that modifications and variations of the arrangements and details described herein will be apparent to others skilled in the art. Therefore, the intention is for the disclosure to be restricted only by the scope of protection of the following patent claims and not by the specific details which have been presented on the basis of the description and the explanation of the exemplary embodiments herein.

The invention claimed is:

1. A wallet, comprising:
   An electronic data storage unit configured to store wallet information, wherein the wallet is an electronic purse configured to associate cryptotokens with a user;
   a data interface configured to provide a read access to the electronic data storage unit;
   a controller configured to control the wallet at a first point in time in a first operating mode, in which there is a restriction for the read access to the wallet information; and to control the wallet at a later second point in time in a second operating mode, in which the restriction to the read access is cancelled,
   wherein a transition from the first operating mode to the second operating mode is irreversible.

2. The wallet as claimed in claim 1, which is configured to carry out the transition from the first operating mode to the second operating mode on the basis of a reprogramming of the controller and/or on the basis of an irreversible change in an electrical interconnection of the wallet.

3. The wallet as claimed in claim 2, which is configured to carry out the transition from the first operating mode to the second operating mode on the basis of a change in the electrical interconnection of the wallet, wherein the controller is coupled to a circuit element; and
   wherein the controller is configured to change over from the first operating mode to the second operating mode on the basis of a change in an electrical property of the circuit element as change in the electrical interconnection.

4. The wallet as claimed in claim 3, wherein the circuit element comprises an electrical line connected between two terminals of the controller in order to electrically connect the two terminals to one another; and wherein the controller is configured to change over from the first operating mode to the second operating mode on the basis of a disconnection of the electrical connection.

5. The wallet as claimed in claim 3, wherein in the first operating mode the circuit element is arranged at least partly in a separation region of the wallet, and the separation region is configured to be mechanically separated from a remaining region of the wallet in order to bring about the change in the electrical interconnection of the wallet.

6. The wallet as claimed in claim 3, wherein the two terminals comprise at least one general purpose input output (GPIO) terminal.

7. The wallet as claimed in claim 1, which is formed as a hardware token in which the controller is embedded;
   wherein in the first operating mode an electrically conductive connection embedded in the hardware token is coupled between two terminals of the controller;
   wherein the wallet is configured to provide an interruption of the electrically conductive connection upon a separation of a predefined region of the hardware token; and
   wherein the controller is configured to change over to the second operating mode on the basis of the interruption.

8. The wallet as claimed in claim 1, wherein the controller is configured, in the second operating mode, to permit a predetermined number of uses of the wallet information and to restrict or to prevent a further use when a predefined number of uses is reached.

9. The wallet as claimed in claim 1, wherein the wallet information comprises a private key, and the wallet is configured to generate a signature using the private key in the second operating mode.

10. The wallet as claimed in claim 1, which is designed in accordance with a database system; and which is configured to change over to a third operating mode after a readout of the wallet information or after a use of the wallet information in the database system, a further use of the wallet information being restricted or prevented in said third operating mode.

11. The wallet as claimed in claim 10, wherein the controller is configured to deactivate the data interface in the third operating mode in order to prevent a further read access to the wallet information.

12. The wallet as claimed in claim 1, wherein the wallet information is second information and wherein the controller is configured, in the first operating mode, to read first information different than the second information from the electronic data storage unit and to output it at the data interface.

13. The wallet as claimed in claim 12, wherein the first information comprises a public key of a key pair and the second information comprises a private key of the key pair or information derived therefrom.

14. The wallet as claimed in claim 1, which is designed in accordance with a database system; and wherein the wallet information comprises a private key of the database system.

15. The wallet as claimed in claim 1, which is designed in accordance with a database system; and wherein the wallet information represents at least one unique cryptotoken of the database system.

16. The wallet as claimed in claim 1, wherein the data interface comprises a near field communication interface.

17. The wallet as claimed in claim 1, wherein the controller is configured, upon an initialization of the wallet, to generate the wallet information and to store it in the electronic data storage unit.

18. The wallet as claimed in claim 17, wherein the controller is configured to receive a start value via the data interface and to generate the wallet information according to a seed mechanism.

19. The wallet as claimed in claim 18, which is configured to generate a key pair comprising a public key and a private key from the start value, wherein the wallet information comprises the private key; and the wallet is configured to output the public key in the first operating mode via the data interface.

20. A database system, comprising:
   a repository configured to manage a cryptotoken of the database system; and
   a wallet as claimed in claim 1, which is associated with the cryptotoken in the database system; wherein the wallet information is associated with the cryptotoken;
   wherein the database system is configured to change an association of the cryptotoken in the database system using the wallet information.

21. The database system as claimed in claim 20, which is configured to store a use of the wallet information in the database system.

22. The database system as claimed in claim 20, which is configured, on the basis of a use of the wallet information in the database system, to exclude the wallet information from a further use or to restrict a further use.

23. A method for producing a wallet, comprising:
   Providing an electronic data storage unit configured to store wallet information, wherein the wallet is an electronic purse configured to associate cryptotokens with a user;
   providing a data interface in order to provide a read access to the electronic data storage unit; and
   arranging a controller configured to control the wallet in a first operating mode, in which there is a restriction for the read access to the wallet information; and to control the wallet in a second operating mode, in which the restriction to the read access is cancelled;
   such that a transition from the first operating mode to the second operating mode is irreversible.

* * * * *